United States Patent [19]

Pettit, Jr.

[11] Patent Number: 4,988,767

[45] Date of Patent: Jan. 29, 1991

[54] THERMOSETTING POWDER COATING COMPOSITION CONTAINING A MIXTURE OF LOW TG AND HIGH TG POLYMERS WITH ACID FUNCTIONAL GROUPS

[75] Inventor: Paul H. Pettit, Jr., Wexford, Pa.

[73] Assignee: PPG Industries, Inc., Pittsburgh, Pa.

[21] Appl. No.: 408,856

[22] Filed: Sep. 18, 1989

[51] Int. Cl.$^5$ .............................................. C08L 33/02
[52] U.S. Cl. .................................... 525/194; 525/108; 525/111; 525/131; 525/172; 525/176; 525/214; 525/221; 525/934
[58] Field of Search ................ 525/194, 108, 214, 221

[56] References Cited

U.S. PATENT DOCUMENTS

| | | | |
|---|---|---|---|
| 3,846,368 | 11/1974 | Pettit, Jr. | 523/437 |
| 3,862,063 | 1/1975 | Pettit, Jr. | 260/15 |
| 3,998,768 | 12/1976 | Pettit, Jr. | 260/17 R |
| 3,998,905 | 12/1976 | Labana et al. | 523/437 |
| 4,021,504 | 5/1977 | Conrad et al. | 260/836 |
| 4,076,917 | 2/1978 | Swift et al. | 525/329.9 |
| 4,727,111 | 2/1988 | Pettit, Jr. et al. | 525/329.9 |
| 4,801,680 | 1/1989 | Geary et al. | 525/50 |

FOREIGN PATENT DOCUMENTS 1333361 10/1973 United Kingdom ............... 525/108

Primary Examiner—John C. Bleutge
Assistant Examiner—Robert E. L. Sellers, II
Attorney, Agent, or Firm—Daniel J. Long

[57] ABSTRACT

A thermosetting powder coating composition which has good stability, pigment dispersion and impact characteristics is disclosed. The composition comprises a co-reactable particle mixture of an acid group-containing acrylic polymer having a Tg in the range of $-20°$ C. to $30°$ C., an acid group-containing acrylic polymer having a Tg in the range of $40°$ C. to $100°$ C. and a curing agent, therefor.

8 Claims, No Drawings

THERMOSETTING POWDER COATING COMPOSITION CONTAINING A MIXTURE OF LOW TG AND HIGH TG POLYMERS WITH ACID FUNCTIONAL GROUPS

BACKGROUND OF THE INVENTION

1. Field of the Invention

The present invention relates to thermosetting powder coating compositions and more particularly to acrylic powder coating compositions containing acid functionalized acrylics.

2. Brief Description of the Prior Art

Powder coating compositions for use in painting are extremely desirable. Such coating compositions greatly reduce and can even eliminate the organic solvents used in liquid paints. When the powder coating composition is cured by heating, little, if any, volatile material is given off to the surrounding environment. This is a significant advantage over liquid paints in which organic solvent is volatilized into the surrounding atmosphere when the paint is cured by heating.

Carboxyl functional acrylic based powder coatings offer many potential advantages relative to other types of powder coatings including the capability of providing hard, chemically resistant and exteriorly durable films. Additionally, when properly formulated, these acrylic powder coatings can provide excellent corrosion, stain and detergent resistance as well as forming coatings which when exposed to high temperatures have good non-yellowing characteristics. Examples of such powder coatings are disclosed in U.S. Pat. No. 4,021,504 to Conrad and U.S. Pat. No. 4,727,111 to Pettit et al.

While acid functional acrylic based powders have many potential advantages, they do suffer from some product limitations. The inherently high viscosity of high Tg (>40° C.) acid functional acrylic resins makes them difficult to process in typical powder extruders, resulting in poor mixing and relatively poor flow and film smoothness. The high viscosity of the acrylic resins, together with the poor mixing capability of such high Tg materials, can give poor pigment dispersion during extrusion processing, resulting in lower gloss coatings with less than optimum hiding power. Finally, acrylic powders in general have poor flexibility as evidenced by low impact and bend resistance.

Other thermosetting acid functional powder coatings such as polyesters generally have somewhat better flexibility than acrylics, but certain uses for these materials also require improved impact and bend resistance.

SUMMARY OF THE INVENTION

The composition of the present invention comprises 1 to 20 percent by weight of an acid group-containing polymer having a Tg from −20° C. to 30° C., from 50 to 75 percent by weight of a second acid group-containing polymer having a Tg in the range of 40° C. to 100° C. and a curing agent capable of reacting with acid groups in the polymers to form a crosslinked product. Such compositions have good processability, good powder stability, i.e., do not clump when exposed to heat, and can give coatings with good exterior durability and a good blend of other physical properties such as good appearance, flexibility, hardness, solvent resistance and corrosion resistance. They also have improved pigment dispersions, i.e., higher gloss, less pigment float and good impact, and adhesion characteristics.

DETAILED DESCRIPTION

When the acid group-containing polymers are acrylic polymers, both the high and low Tg acid group-containing acrylic polymers preferably have a number average molecular weight of about 1,500 to 15,000, preferably 2,300 to 6,000. The high Tg acrylic polymer has a glass transition temperature (Tg) in the range of 40° C. to 100° C.. The low Tg acrylic polymer has a Tg in the range of −20° C. to 30° C.. The high Tg acrylic polymer provides for hardness, gloss, durability and solvent resistance in the resulting coating. The low Tg acrylic polymer contributes flexibility and improved leveling, good pigment dispersion and dispersion stability.

The molecular weights of the acrylic polymer are determined by gel permeation chromatography (GPG) using a polystyrene standard. Therefore, it is not the actual molecular weight which is measured but an indication of the molecular weight as compared to polystyrene. The values which are obtained are commonly referred to as polystyrene numbers; however, for the purposes of this application, they are referred to as molecular weights. If the number average molecular weight is below 1500, the solvent resistance and mechanical strength of the resultant coating may be poor. If the molecular weight is higher than 15,000, the melt flow of the polymer is low and the coating may have poor appearance.

The Tg of the polymer is a measure of the hardness and melt flow of the polymer. The higher the T8, the less the melt flow and the harder the coating. Tg described in *PRINCIPLES OF POLYMER CHEMISTRY* (1953), Cornell University Press. The Tg can be actually measured or it can be calculated as described by Fox in *Bull. Amer. Physics Soc.* 1, 3, page 123 (1956). Unless stated otherwise, Tg as used herein refers to actually measured values. For measurement of the Tg of the polymer, differential scanning calorimetry can be used (rate of heating 10° C. per minute, Tg taken at the first inflection point).

If the glass transition temperature of the high Tg acrylic polymer is below 40° C., the powder tends to cake. If the glass transition temperature of the high Tg acrylic polymer is above 100° C., it will tend to be highly viscous and brittle. In the case of the low Tg acrylic polymer, if the Tg is above 30° C., there is no significant improvement. If the Tg is below −20° C., there is poor powder stability.

Carboxylic acid group-containing acrylic polymers can be formed by reacting a polymerizable alpha, beta-ethylenically unsaturated carboxylic acid with one or more polymerizable alpha, beta-ethylenically unsaturated monomers, particularly vinyl aromatic monomers and esters of alpha, beta-ethylenically unsaturated carboxylic acids.

Examples of the carboxylic acid group-containing monomers which can be used are acrylic acid and methacrylic acid, which are preferred, as well as crotonic acid, itaconic acid, fumaric acid, maleic acid, citraconic acid, and the like, as well as monoalkylesters of unsaturated dicarboxylic acids. The acid group-containing monomer is preferably present in the polymer in amounts of about 6 to 25 percent by weight, more preferably from 8 to 18 percent by weight on total weight of the monomers. Amounts less than 6 percent by weight may result in poor solvent resistance and poor mechanical strength of the coating.

Examples of vinyl aromatic compounds are monofunctional vinyl aromatic compounds such as styrene, which is preferred, and alkyl-substituted styrenes such as alpha-methylstyrene and chloro-substituted styrene such as chlorostyrene. For exteriorly durable products, the vinyl aromatic monome is preferably present in the composition in amounts of about 5 to 45, more preferably from 10 to 25 percent by weight based on the total weight of the monomers. Amounts less than 5 percent by weight may result in poor corrosion resistance, whereas amounts greater than 25 percent by weight may result in poor exterior durability.

Examples of esters of alpha, beta-ethylenically unsaturated acids are esters of acrylic and methacrylic acid and include methyl methacrylate, ethyl acrylate, butyl acrylate, 2-ethylhexyl acrylate, dodecyl acrylate, methyl methacrylate, ethyl methacrylate, lauryl methacrylate, N-butyl methacrylate and 2-ethylhexyl methacrylate. Preferably, these esters are present in amounts of about 5 to 80, more preferably from about 30 to 70 percent by weight based on total weight of the monomers. Preferably, the esters of the alpha, beta-ethylenically unsaturated acids are a mixture of $C_1$ to $C_2$ alkyl esters and $C_4$ to $C_{20}$ alkyl esters, such as a mixture of methyl methacrylate and butyl acrylate. Preferably, the $C_4$ to $C_{20}$ alkyl ester is present in amounts of 5 to 80, more preferably 10 to 60 percent by weight based on total weight of monomers. For the high Tg acrylic polymer, amounts less than 5 percent by weight may result in coatings with poor flexibility and impact resistance, whereas amounts greater than 30 percent by weight may cause stability problems in the coating composition. For the low Tg acrylic polymer, amounts less than 30 percent by weight would result in a lack of flexibility and pigment dispersion while amounts more than 65-70 percent might cause stability problems. The $C_1$ to $C_2$ alkyl ester is preferably present in amounts of 15 to 80, more preferably present in amounts of 30 to 60 percent by weight based on total weight of the monomers in the high Tg resin and 0 to 45 percent in the low Tg resin. Amounts less than 15 percent by weight in the high Tg resin may result in coatings with poor hardness and durability, whereas amounts greater than 80 percent by weight may result in coatings with poor flexibility. If the low Tg resins are more than 45 percent, stability problems might result.

In addition to the vinyl aromatic compounds and esters of acrylic and methacrylic acid, other ethylenically unsaturated copolymerizable monomers may be used. Examples include nitriles such as acrylonitrile, vinyl and vinylidene halides such as vinyl chloride and vinylidene fluoride and vinyl esters such as vinyl acetate. These additional monomers are present in amounts of about 0 to 40, preferably from 0 to 30 percent by weight based on total weight of monomers.

In preparing the acid group-containing acrylic polymers, the various monomers are mixed together and are reacted by conventional free radical initiated polymerization processes. Among the free radical initiators which may be used are benzoyl peroxide, tertiarybutyl hydroperoxide, ditertiarybutyl peroxide, azobis(2-methylpropionitrile) and so forth. Chain transfer agents such as mercaptopropionic acid can also be used. The polymerization is preferably carried out in solution using a solvent in which the monomers are soluble such as toluene or xylene. At the completion of the polymerization, the reaction mixture is devolatilized such as by placing it under vacuum to remove the organic solvent and recovering the polymer as a solid material. Alternately, the polymer can be precipitated and subsequently dried. Usually, the devolatilized polymer will contain less than 1 percent by weight of materials that volatilize at the temperatures used for curing the coatings.

The acid group-containing acrylic polymers can also be prepared by emulsion polymerization, suspension polymerization, bulk polymerization or suitable combinations thereof. These techniques are well known in the art. Besides free radical initiated polymerization, other means of polymerization such as group transfer and anionic polymerization can be used to prepare the acrylic polymers.

The low Tg acid group-containing acrylic polymer is preferably used in amounts of about 1 to 25 percent, more preferably 10 to 20 percent by weight based on weight of resin solids. The high Tg acid group-containing acrylic polymer is preferably used in amounts of about 40 to 75 percent, more preferably 50 to 60 percent by weight based on weight of resin solids. Amounts of more than 25 percent by weight and less than 40 percent by weight, respectively, of the low Tg acid group-containing acrylic polymer and the high Tg acid group-containing acrylic polymer are not preferred because of stability concerns. Amounts greater than 75 percent by weight of the high Tg acid group-containing acrylic polymer may result in coatings with poor flow, flexibility, and impact strength while amounts less than 40 percent might result in stability problems.

Besides the carboxylic acid group-containing materials described above, other optional polycarboxylic acid group-containing materials can be included in the composition. Examples of these other materials are carboxylic acid group-containing polyesters and carboxylic acid group-containing polyurethanes.

The carboxylic acid group-containing polyester contributes flexibility, impact resistance and corrosion resistance to coatings deposited from the compositions of the present invention. Among the carboxylic acid group-containing polyesters which may be used are those based on condensing aliphatic including cycloaliphatic polyols with aliphatic and/or aromatic polycarboxylic acids and anhydrides. Examples of suitable aliphatic polyols include ethylene glycol, propylene glycol, butylene glycol, 1,6-hexylene glycol, neopentyl glycol, cyclohexanedimethanol, trimethylolpropane and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid and anhydrides of such acids.

These ingredients are reacted together with an excess of acid to alcohol so as to form a polyester which has free carboxylic acid groups. Preferably, on a resin solids basis, the carboxylic acid group-containing polyester will have an acid number of about 15 to 300 and will be a solid at room temperature. If the polyester is present in the composition, it is present in amounts of 5 to 40 percent by weight, preferably about 15 to 35 percent by weight based on weight of resin solids. Amounts greater than 40 percent by weight are undesirable because of tendencies towards poor solvent resistance and poor exterior durability in the coating.

The carboxylic acid group-containing polyurethane contributes durability to the resultant coating. The polyurethane can be prepared by reacting polyols and polyisocyanates so as to form a polyurethane polyol which is then reacted with polycarboxylic acid or anhydride to introduce free carboxyl groups into the reaction product. Examples of polyols include those mentioned above in connection with the preparation of the polyester. Examples of polyisocyanates are aromatic and aliphatic polyisocyanates with the aliphatic polyisocyanates being preferred because of better exterior durability. Specific examples include 1,6-hexamethylene diisocyanate, isophorone diisocyanate and 4,4'-methylene-bis-(cyclohexyl isocyanate). Examples of suitable polycarboxylic acids are those mentioned above in connection with the preparation of the polyester. Preferably, the carboxylic acid group-containing polyurethane has an acid number on a resin solids basis of about 15 to 300 and will be solid at room temperature. If the polyurethane is used, it is used in amounts of 5 to 40 percent by weight, preferably about 15 to 35 percent by weight based on weight of resin solids. Amounts greater than 40 percent by weight are undersirable because of poor stability in the coating composition.

Curing agents are those materials capable of reacting with acid groups to form a crosslinked product. Of most significance are polyepoxies and beta-hydroxyalkylamides.

A wide variety of polyepoxides may be utilized as in the powder coating compositions. Preferably, the polyepoxide should have a 1,2-epoxy equivalency greater than one and more preferably greater than about 1.9. Examples of useful polyepoxides are polyglycidyl ethers of aromatic polyols, e.g., polyphenols. Such polyepoxides can be produced, for example, by etherification of an aromatic polyol with epichlorohydrin or dichlorohydrin in the presence of an alkali. The aromatic polyol may be, e.g., bis(4-hydroxyphenyl)-2,2-propane (generally known as bisphenol A), bis(4-hydroxyphenyl)-1,1-ethane, bis(4-hydroxyphenyl)-1,1-isobutane, bis(4-hydroxy tertiarybutylphenyl)-2-2-propane, bis(2-hydroxynaphthyl)methane, 4,4'-dihydroxybenzophenone, 1,5-dihydroxynaphthalene and the like. Polyepoxides based on bisphenol A are preferred from among the polyglycidyl ethers of aromatic polyols.

Also, suitable as the polyepoxide are polyglycidyl ethers of polyhydric alcohols, such as 1,2-ethanediol, 1,2-propanediol, 1,3-propanediol, 1,4-butanediol, 1,5-pentanediol, diethylene glycol, triethylene glycol, polyethylene glycol, polypropylene glycol and the like. Also suitable would be cycloaliphatic epoxies such as ERL-4221 available from Union Carbide Corporation and EHPE-3150 available from Daicel.

Generally, the polyepoxides have epoxy equivalent weights from about 100 to 1,000, preferably from about 150 to about 800. The polyepoxides are preferably present in amounts from about 2 to about 45 percent by weight, more preferably from about 10 to about 40 percent by weight based on total weight of resin solids in the powder coating composition.

The beta-hydroxyalkylamide curing agents can be depicted structurally as follows:

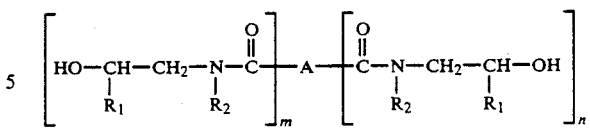

where $R_1$ is H or $C_1-C_5$ alkyl;

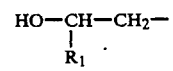

or wherein $R_1$ is as described above; A is a bond, monovalent or polyvalent organic radical derived from a saturated, unsaturated or aromatic hydrocarbon including substituted hydrocarbon radicals containing from 2 to 20 carbon atoms. Preferably, A is an alkylene radical —$(CH_2)X$— where X is equal to 0 to 12, preferably 4 to 10; m is equal to 1 to 2 and n is equal to 0 to 2 and m + n is at least 2, preferably greater than 2, usually within the range of being greater than 2 and up to and including 4.

The beta-hydroxyalkylamides can be prepared by reacting a lower alkyl ester or mixture of esters of carboxylic acids with a beta-hydroxyalkylamine at a temperature ranging from ambient temperature up to about 200° C., depending on the choice of reactants and the presence or absence of catalyst. Suitable catalysts includes sodium and potassium methoxide or butoxide present in amounts of about 0.1 to 1 percent by weight based on weight of alkyl ester.

To bring about effective cure of the composition, the equivalent ratio of acid to the curing group, i.e., epoxy group or beta-hydroxyalkylamide group, is from about 1.6/1.0 to 0.5/1.0, more preferably in the range of 1.3/1.0 to 0.7/1.0. Ratios outside these ranges are undesirable because of poor cure.

In order to give the powder coating composition a suitable color, a pigment can be included in the coating composition typically in amounts of from about 1 to 50 percent by weight based on total weight of the powder coating composition. Pigments which are suitable for powder coating compositions include basic lead silica chromate, titanium dioxide, ultramarine blue, phthalocyanine blue, phthalocyanine green, carbon black, black iron oxide, chromium green oxide, ferrite yellow and quindo red.

The coating composition may also contain certain other additives that are typically incorporated into powder coating compositions such as degassing agents, flow control agents, UV absorbing agents, and anti-oxidants.

Particularly recommended are degassing agents which allow volatiles to escape from the film during baking and flow control agents which prevent cratering of the finish. Benzoin is a highly preferred degassing agent and when used is present in amounts ranging from 0.5 to 3 percent by weight based on total weight of the composition.

One group of suitable flow control agents are acrylic polymers such as polylauryl acrylate, polybutyl acrylate, poly(2-ethylhexyl) acrylate, poly(ethyl-2-ethylhexyl) acrylate, polylauryl methacrylate and polyisodecenyl methacrylate. The flow control agent may also be a fluorinated polymer such as an ester of polyethylene glycol or polypropylene glycol and fluorinated fatty acids, for example, an ester of polyethylene glycol of a molecular weight of over 2500 and perfluorooctanoic acid. Polymeric siloxanes of molecular weights over 1000 may also be used as a flow control agent, for example, poly(dimethylsiloxane) or poly(methylphenyl)siloxane. The flow control agent when used is present in amounts of about 0.5 to 5 percent by weight based on total weight of the coating composition.

For good exterior durability, the compositions also preferably contain UV absorbing agents and anti-oxidants. Such materials are commercially available from Giba-Geigy under the trademark TINUVIN and IRGANOX. The UV absorbing agents and anti-oxidants when used are typically present in the compositions individually in amounts of about 1.5 to 6 percent by weight based on weight of resin solids.

The thermosetting powder coating compositions are prepared by melt blending the ingredients of the coating compositions. This can be accomplishad by first blending in a high-intensity mixer and then melt blending in an extruder at a temperature of about 80° to 130° C.. The extrudate is then cooled and particulated into a powder. The powder coating composition can then be applied directly to metal such as steel or aluminum, glass, plastic or fiber-reinforced plastic substrates.

As an alternative to producing two separate acrylic polymers, a high Tg and low Tg, it would also be possible to prepare an acid group-containing polymer blend consisting of (i) from about 1 percent to about 25 percent by weight based on the weight of resin solids of monomers from which a first acid group-containing polymer having a Tg in the range of about −20° C. to about 30° C. might be prepared and (ii) from about 40 percent to about 75 percent by weight based on the weight of resin solids of monomers from which a second acid group-containing polymer having a Tg in the range of 40° C. to about 100° C. might be prepared. A co-reactable particulate mixture of the polymer blend and a curing agent capable of reacting with acid groups in the polymer blend to form a crosslinked product may then be formed. The blend may be prepared by first preparing the first acid group-containing polymer having a Tg in the range of about −20° C. to about 30° C. and then using said first acid group-containing polymer in solution as a polymerization media for the preparation of the second acid group-containing polymer having a Tg in the range of 40° C. to about 100° C. The polymers may be acrylic polymers of any of the types disclosed above. The curing agent may also be either a beta-hydroxyalkylamide or a polyepoxide of any of the types disclosed above.

Application of the powder can be by electrostatic spraying or by the use of a fluidized bed. Preferred is electrostatic spraying, the powder composition can be applied in one pass or in several passes to provide a film thickness after cure of about 0.5 to 5 mils. Preferably, to provide a high-quality finish at reasonable cost, the thickness of the powder coat is about 1.2 to 4 mila, preferably 1.4 to 3 mils.

The substrate to be coated can optionally be preheated prior to application of the powder to promote more uniform powder deposition. Upon application of the powder, the powder-coated substrate is baked typically at 250° to 400° F. (121° to 204° C.) for about 20 to 60 minutes.

The present invention will be more fully understood from the following illustrative examples wherein all quantities, percentages and ratios are on a weight basis unless otherwise indicated.

The following examples (A-E) show the preparation of various carboxylic acid group-containing polymers.

EXAMPLE A

A high Tg carboxylic acid group-containing acrylic polymer was prepared from the following ingredients:

| Ingredients | Parts by Weight (grams) |
| --- | --- |
| Reactor Charge | |
| Xylene | 2400 |
| Initiator Charge | |
| LUPERSOL 555-M60[1] | 350 |
| Xylene | 795 |
| Monomer Charge | |
| Styrene | 900 (15%) |
| Methyl methacrylate | 3750 (62.5%) |
| Butyl acrylate | 720 (12.0%) |
| Acrylic acid | 630 (10.5%) |
| Rinse/Post Add | |
| Xylene | 336 |
| Liquid MODAFLOW[2] | 18.0 |

[1]LUPERSOL 555-M60 is an amyl peroxide catalyst available from Lubrizol Corp.
[2]Liquid MODAFLOW is poly(2-ethylhexyl-ethyl) acrylate available from Monsanto Co.

The reaction charge was heated under a nitrogen atmosphere to reflux. The initiator charge and monomer charge were then added slowly and simultaneously to the reactor charge over a period of three hours while keeping the reaction mixture at reflux. After the feeds of the initiator charge and monomer charge were completed, the reaction mixture was held for 2 hours at reflux, and then the post-add rinse was added. The reaction mixture was then heated under vacuum to remove solvent. The resultant reaction product had a solids content of 99.7 percent, an acid value of 77, a number average molecular weight of 3500 and a measured Tg of 64° C.. Molecular weights were determined by gel permeation chromatography using a polystyrene standard, and Tg was measured using a DU PONT Model #2100 Thermal Analyzer.

EXAMPLE B

A low Tg carboxylic acid group-containing acrylic polymer was prepared from the following ingredients.

| Ingredients | Parts by Weight (grams) |
| --- | --- |
| Reactor Charge | |
| Xylene | 2400 |
| Initiator Charge | |
| LUPERSOL 555-M60 | 350 |
| Xylene | 795 |
| Monomer Charge I | |
| Styrene | 450 |
| Methyl methacrylate | 1110 |
| Butyl acrylate | 1462 |
| Acrylic acid | 220.5 |
| Monomer Charge II | |
| | (cumulative) |
| Styrene | 450 (15%) |
| Methyl methacrylate | 1110 (37%) |
| Butyl acrylate | 787.5 (37.5%) |
| Acrylic acid | 409.5 (10.5%) |
| Rinse/Post Add | |
| Xylene | 336 |
| Liquid MODAFLOW | 18.0 |

The polymer was prepared as generally described above in Example A except that monomer charge I was added first over a period of 1.5 hours, followed by monomer charge II added over a period of 1.5 hours. The polymer after stripping had a solids content of 99.7 percent, an acid value of 76.1, a number average molecular weight of and a measured Tg of 27° C.

EXAMPLE C

To eliminate the need to produce two separate acrylic polymers, a high Tg and low Tg, a modified process was used in which the low Tg acrylic was prepared and the solution of the low Tg acrylic used as the polymerization media for the high Tg acrylic. The carboxylic acid group-containing acrylic polymer was prepared from the following ingredients:

| Ingredients | Parts by Weight (grams) |
| --- | --- |
| Reactor Charge | |
| Xylene | 800 |
| Liquid MODAFLOW | 6 |
| Initiator Charge I | |
| LUPERSOL 555-M60 | 16 |
| Xylene | 60 |
| Monomer Charge I | |
| Lauryl methacrylate | 128 |
| Butyl methacrylate | 244 |
| Acrylic acid | 28 |
| Mercaptopropionic acid | 6.4 |
| Initiator Charge II | |
| LUPERSOL 555-M60 | 64 |
| Xylene | 241.6 |
| Monomer Charge II | |
| Styrene | 256 |
| Methyl methacrylate | 960 |
| Butyl methacrylate | 240 |
| Acrylic acid | 136.8 |
| Mercaptopropionic acid | 25.6 |
| Monomer Charge III | |
| Acrylic acid | 7.2 |
| Xylene | 30 |
| Rinse | |
| Xylene | 100 |

The polymerization was conducted as generally described in Example A except that monomer and initiator charge I was added over one hour with a ten minute hold prior to start of initiator II and monomer II charges. Monomer and initiator charges II were added over a 90-minute period and then monomer charge III added over a 30-minute period. The reaction mixture was held at reflux for 90 minutes. The reaction mixture was then heated under vacuum to remove solvent. The resultant reaction product had a solids content of 99.7 percent, an acid value of 69.5 and a number average molecular weight of 3000. Calculated Tg of the low Tg acrylic was approximately 0° C.

EXAMPLE D

A high Tg carboxylic acid group-containing acrylic polymer was prepared from the following ingredients:

| Ingredients | Parts by Weight (grams) |
| --- | --- |
| Reactor Charge | |
| Xylene | 800 |
| Liquid MODAFLOW | 6.0 |
| Initiator Charge | |
| LUPERSOL 555-M60 | 83.3 |
| Xylene | 298.7 |
| Monomer Charge | |
| Styrene | 1000 (50%) |
| Butyl methacrylate | 780 (39%) |
| Acrylic acid | 209 (11%) |
| Mercaptopropionic acid | 32 (chain transfer) |
| Rinse | |
| Xylene | 100 |

The polymer was prepared as described above in Example A. The polymer after stripping has a solids content of 99.7 percent, an acid value of 88, a number average molecular weight of 3200 and a calculated Tg of 70° C. Melt viscosity measured at 180° C. using a BROOKFIELD Thermal Cell Viscometer at 2.5 ppm was 8360 cps.

EXAMPLE E

A 75/25 blend of the same high Tg polymer described in Example D with a low Tg acrylic was prepared using the process described in Example C. The carboxylic acid group-containing acrylic polymer was prepared from the following ingredients:

| Ingredients | Parts by Weight (grams) |
| --- | --- |
| Reactor Charge | |
| Xylene | 800 |
| Liquid MODAFLOW | 6 |
| Initiator Charge I | |
| LUPERSOL 555-M60 | 12.5 |
| Xylene | 83.0 |
| Monomer Charge I | |
| Styrene | 75 (15%) |
| Butyl acrylate | 250 (50%) |
| Butyl methacrylate | 135 (27%) |
| Acrylic acid | 40 (8%) |
| Mercaptopropionic acid | 8 (chain transfer) |
| Initiator Charge II | |
| LUPERSOL 555-M60 | 57.5 |
| Xylene | 229 |
| Monomer Charge II | |
| Styrene | 750 (50%) |
| Butyl methacrylate | 585 (39%) |
| Acrylic acid | 165 (11%) |
| Mercaptopropionic acid | 24 (chain transfer) |
| Rinse | |
| Xylene | 100 |

The polymer was prepared as described in Example C above. After stripping, the polymer has a solids content of 99.7 percent, and acid value of 85, and a number average molecular weight of 3500. Calculated Tg of the high Tg component is 70° C. and the calculated Tg of the low Tg polymer is about 2° C. Melt viscosity measured at 180° C. using a BROOKFIELD Thermal Cell Viscometer at 2.5 ppm was 1440 cps.

EXAMPLE F

An acid functional polyester was prepared from the following ingredients:

| Ingredients | Parts by Weight (grams) |
| --- | --- |
| 1,6-hexanediol | 118 |
| Dodecanedioic acid | 460 |
| Dibutyltin oxide | 0.58 |
| Xylene | 144.6 |

The ingredients were charged to a reactor and heated under a nitrogen atmosphere to reflux (about 140° C.). The reaction mixture was gradually heated to about 165° C. while azeotropically distilling water until an acid value of 163 was obtained. The reaction mixture was then heated at 125° C. under vacuum to remove solvent and then cooled to room temperature to give a solid reaction product which had a solids content of 100 percent (two hours at 140° C.), an acid value of 208, a melting point range of 95° C. to 105° C. and a number average molecular weight of 952.

EXAMPLE G

Bis[N,N-di(beta-hydroxyethyl)] adipamide-glutaramide was prepared from the following mixture of ingredients:

| Ingredients | Parts by Weight (grams) |
| --- | --- |
| 90/10 weight ratio of dimethyladipate/dimethyl glutarate | 1038.0 |
| Diethanolamine | 1512.0 |
| Methanolic sodium methoxide | 4.7 (20 ml) |

The ingredients were charged to a reaction vessel and heated to about 100° C. at which point the distillation of methanol began. Reaction was continued while distilling methanol (303 grams) until a temperature of 128° C. was reached. An additional 5 ml of methanolic sodium methoxide was added and heating continued until an additional 5 grams of methanol was obtained. A slight vacuum was applied to the reaction flask and an additional 28 grams of methanol was removed. The methanol distillate was added slowly back into the reaction mixture followed by the addition of 2000 ml of acetone. As the reaction mixture cooled, the hydroxyalkylamide precipitated. The precipitate was filtered, washed with acetone and air dried to yield a reaction product melting at 114°–118° C.

EXAMPLES 1–4

Powder coating compositions were prepared from the mixtures of ingredients as shown on Table I below. The polymers were blended with the other ingredients in the formulation in a HENSCHEL mixer and then melt blended in a BAKER PERKINS twin screw extruder at 130° C.. The extrudate was chilled and flaked on a chill roll at 40° C., ground in a micromill and sieved through a 140 mesh screen. The resulting powder was then electrostatically sprayed onto grounded zinc phosphate pretreated steel panels using an electrostatic spray gun. The coated panels were then baked at 177° C. to form hard glossy coatings. The properties of the resultant coating as well as the stability of the coating composition are reported in Table II below.

TABLE I

| Ingredient | Example 1 | Example 2 | Example 3 | Example 4 |
| --- | --- | --- | --- | --- |
| | (Parts by Weight) | | | |
| Carboxylic acid group-containing polymer of Example A | 51 | 57 | 63.9 | 71.2 |
| Carboxylic acid group-containing polymer of Example B | 20.2 | 14.2 | 7.3 | 0 |
| Polyester flexibilizer of Example F | 12.7 | 12.7 | 12.7 | 12.7 |
| Beta-hydroxyalkylamide of Example G | 16 | 16 | 16 | 16 |

TABLE II

| Example No. | Stability[1] | Gloss[2] 20° | Gloss[2] 60° | Impact Resistance[3] inch-pounds (coating thickness in mils) Direct | Impact Resistance[3] inch-pounds (coating thickness in mils) Reverse | Impact Resistance[3] inch-pounds (coating thickness in mils) Direct | Impact Resistance[3] inch-pounds (coating thickness in mils) Reverse |
| --- | --- | --- | --- | --- | --- | --- | --- |
| 1 | fair | 91 | 79 | 160 | 160 | 140 | 160 |
| 2 | good | 90 | 79 | 160 | 140 | 100 | 140 |
| 3 | excellent | 90 | 78 | 160 | 140 | 100 | 120 |
| 4 | excellent | 90 | 75 | 90 | 100 | 80 | 60 |

[1]Stability determined by placing a sample of the powder coating in a 2 oz. glass jar and immersing in a water bath at 70° C. for 3 days. If there was clumping, a fair rating was given. If there was slight clumping, a good rating was given. If there was very slight clumping, an excellent rating was given.
[2]The 20° and 60° gloss were measured with gloss meters manufactured by the Gardner Instrument Company.
[3]The impact resistance was measured with a GARDNER Impact Tester. The coated panels were subjected to increasing amounts of impact until the coating cracked. The panel was impacted on the coating side, i.e., direct impact, and also on the side of the coated panel opposite the coating, i.e., reverse impact. The results are reported in inch-pounds and the thickness of the coating in mils is shown in the parenthesis. Zinc phosphate pretreated steel panels were used.
[4]Same as 3 except with iron phosphate pretreated steel panels.

EXAMPLES 5–6

Powder coating compositions were prepared from the mixtures of ingredients as shown in Table III below. The polymers were blended with the other ingredients in a HENSCHEL mixer and then melt blended in a BAKER PERKINS twin screw extruder at 100° C. The extrudite was chilled and flaked one chill roll at 40° C., ground in a micromill and sieved through a 140 mesh screen. The resulting powder was then electrostatically sprayed onto grounded stell panels using an electrostatic spray gun. The coated panels were than baked at 177° C. to form hard glossy coatings. The properties of the resultant coatings are reported in Table IV below.

TABLE III

| Ingredient | Examples 5 (Parts by Weight) | Examples 6 (Parts by Weight) |
| --- | --- | --- |
| Carboxylic acid group-containing polymer of Example D | 500 | |
| Carboxylic acid group-containing polymer of Example E | | 500 |
| EPON 828[1] | 40 | 40 |
| ECN-1299[2] | 50 | 50 |
| GT-9013[3] | 100 | 100 |
| Ethyl triphenyl phosphonium acetate catalyst (60% active on silica) | 3.0 | 3.0 |
| Black pigment | 0.2 | 0.2 |
| Blue pigment | 1.0 | 1.0 |
| Benzoin | 4.8 | 4.8 |
| MODAFLOW III[4] | 5.0 | 5.0 |
| IRGANOX 1076[5] | 10 | 10 |

[1]EPON 828 is a bisphenol A epoxy resin available from Shell Chemical Co.
[2]ECN-1299 is an epoxy cresole novolak available from Ciba-Geigy.
[3]GT-9013 is a bisphenol A epoxy resin available from Ciba-Geigy.
[4]MODAFLOW III is poly(2-ethylhexyl-ethyl) acrylate on silica carrier available from Monsanto Co.
[5]IRGANOX 1076 is a polyphenol stabilizer that inhibits oxidation available from Ciba-Geigy.

TABLE IV

| Example No. | Stability | Gloss[2] 20° | Gloss[2] 60° | Impact Resistance[3] inch-pounds (coating thickness in mils) Direct | Impact Resistance[3] inch-pounds (coating thickness in mils) Reverse | Mandrel Bend[4] |
| --- | --- | --- | --- | --- | --- | --- |
| 5 | fair | 71 | 90 | 35 | <5 | Delamination |

TABLE IV-continued

| Example No. | Stability | Gloss[2] 20° | 60° | Impact Resistance[3] inch-pounds (coating thickness in mils) | | Mandrel Bend[4] |
| --- | --- | --- | --- | --- | --- | --- |
| | | | | Direct | Reverse | |
| 6 | fair | 89 | 95 | 70 | 15 | No cracking |

[1] See footnote 1, Table II.
[2] See footnote 2, Table II.
[3] See footnote 3, Table II.
[4] The mandrel bend test is determined by bending coated panels (4" × 12") around a ⅛ inch mandrel and measuring cracking/delamination in inches along the bend line.

As can be seen from Tables II and IV, use of the blend of low Tg and high Tg acrylic has significant effect on overall appearance (gloss) as well as resulting in flexibility, processability and pigment dispersion.

What is claimed is:

1. A powder coating composition comprising:
    (a) about 1 percent to about 25 percent by weight based on the weight of resin solids of a first acid group-containing acrylic polymer having a Tg in the range of about −20° C. to about 30° C.;
    (b) about 40 percent to about 75 percent by weight based on weight of resin solids of a second acid group-containing acrylic polymer having a Tg in the range of about 40° C. to about 100° C.; and
    (c) a beta-hydroxyalkylamide curing agent capable of reacting with acid groups in (a) and (b) to form a crosslinked product.

2. The composition of claim 1 in which the acrylic polymers have a number average molecular weight within the range of 1500 to 15,000.

3. The composition of claim 1 in which the acrylic polymers are formed from polymerizing an alpha, beta-ethylenically unsaturated carboxylic acid selected from the group consisting of acrylic acid and methacrylic acid, a $C_1$ to $C_{20}$ alkyl ester of acrylic or methacrylic acid including mixtures of such esters and a polymerizable vinyl aromatic compound.

4. The composition of claim 3 which contains a $C_1$ to $C_2$ alkyl ester of acrylic or methacrylic acid and a $C_4$ to $C_{20}$ alkyl ester of acrylic or methacrylic acid.

5. The composition of claim 1 in which the hydroxyalkylamide is of the structure:

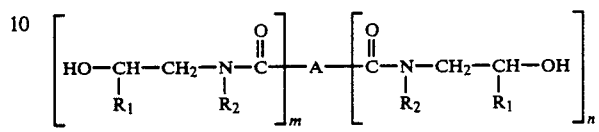

wherein $R_1$ is H or $C_1$–$C_5$ alkyl; $R_2$ is H, $C_1$–$C_5$ alkyl or

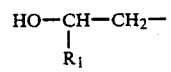

wherein $R_1$ is as described above and A is a chemical bond or monovalent or polyvalent organic radical derived from saturated, unsaturated or aromatic hydrocarbon radicals including substituted hydrocarbon radicals containing from 2 to 20 carbon atoms; m equals 1 to 2 and n equals 0 to 2 and m+n is at least 2.

6. The composition of claim 1 wherein the composition is a co-reactable particulate mixture of elements (a), (b) and (c).

7. The composition of claim 1 wherein at least part of the composition is a polymer blend comprising elements (a) and (b).

8. The composition of claim 1 which is a thermosetting composition.

* * * * *